United States Patent
Kanazawa et al.

(10) Patent No.: US 6,559,814 B1
(45) Date of Patent: May 6, 2003

(54) DRIVING PLASMA DISPLAY PANEL WITHOUT VISIBLE FLICKERING

(75) Inventors: Yoshikazu Kanazawa, Kawasaki (JP); Kyoji Kariya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/348,162

(22) Filed: Jul. 7, 1999

(30) Foreign Application Priority Data

Oct. 1, 1998 (JP) .......................................... 10-280343

(51) Int. Cl.⁷ ............................................... G09G 3/28
(52) U.S. Cl. ........................................................ 345/60
(58) Field of Search ........................... 345/60, 63, 66, 345/67, 68; 315/169.1, 169.4

(56) References Cited

U.S. PATENT DOCUMENTS

| | | | |
|---|---|---|---|
| 5,029,257 A | | 7/1991 | Kim |
| 5,436,634 A | * | 7/1995 | Kanazawa .................. 345/67 |
| 6,084,558 A | * | 7/2000 | Setoguchi et al. ............ 345/60 |
| 6,151,000 A | * | 11/2000 | Ohtaka et al. ............... 345/63 |
| 6,160,529 A | * | 12/2000 | Asao et al. .................. 345/60 |
| 6,172,465 B1 | * | 1/2001 | Huang ....................... 315/169.3 |
| 6,219,012 B1 | * | 4/2001 | Holtslag ...................... 345/60 |
| 6,236,380 B1 | * | 5/2001 | Wani et al. .................. 345/60 |

FOREIGN PATENT DOCUMENTS

| | | |
|---|---|---|
| EP | 0 762 373 | 3/1997 |
| EP | 0 890 941 | 1/1999 |
| JP | 9-160525 | 6/1997 |
| WO | 97/08028 | 11/1997 |

* cited by examiner

Primary Examiner—Richard Hjerpe
Assistant Examiner—Ronald Laneau
(74) Attorney, Agent, or Firm—Staas & Halsey LLP

(57) ABSTRACT

A method of displaying display data on a plasma display panel which displays odd-number lines in a plurality of sub-fields and even-number lines in a plurality of sub-fields includes the steps of checking whether the display data is computer-related data or video data. The method further includes the steps of displaying odd-number lines in a predetermined number of sub-fields during a given vertical scan cycle and even-number lines in the predetermined number of sub-fields during another vertical scan cycle if the display data is video data, and displaying odd-number lines in half the predetermined number of sub-fields and even-number lines in the remaining half of the predetermined number of sub-fields in each vertical scan cycle if the display data is computer-related data.

8 Claims, 12 Drawing Sheets

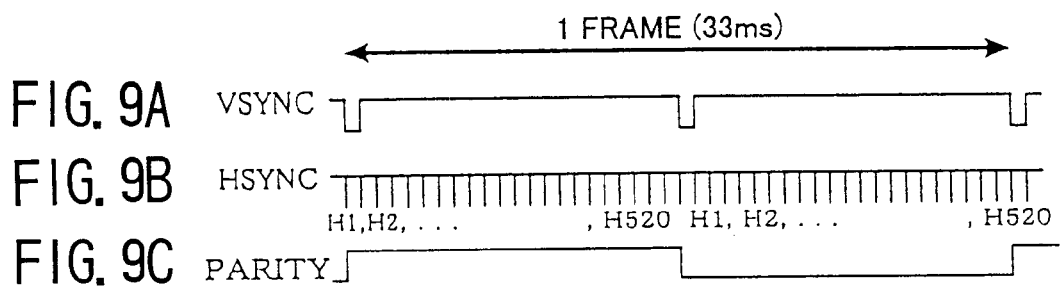
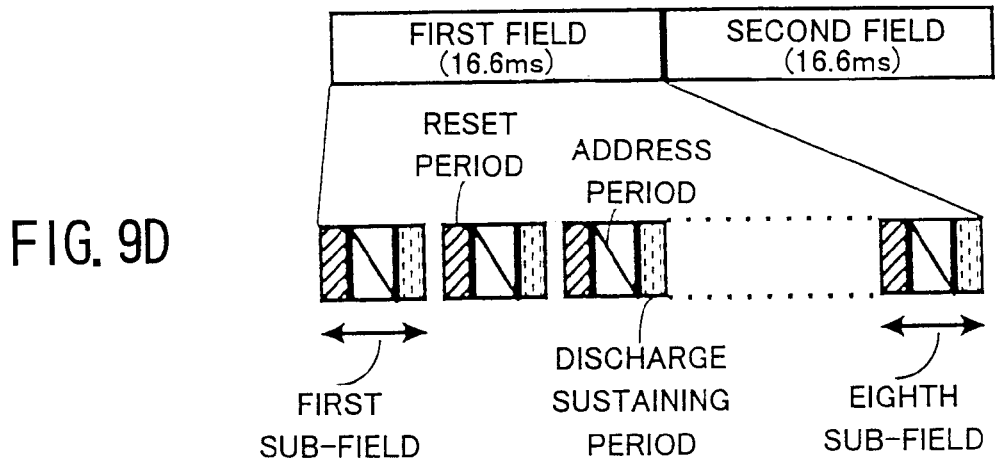
FIG. 9A VSYNC
FIG. 9B HSYNC
FIG. 9C PARITY
FIG. 9D

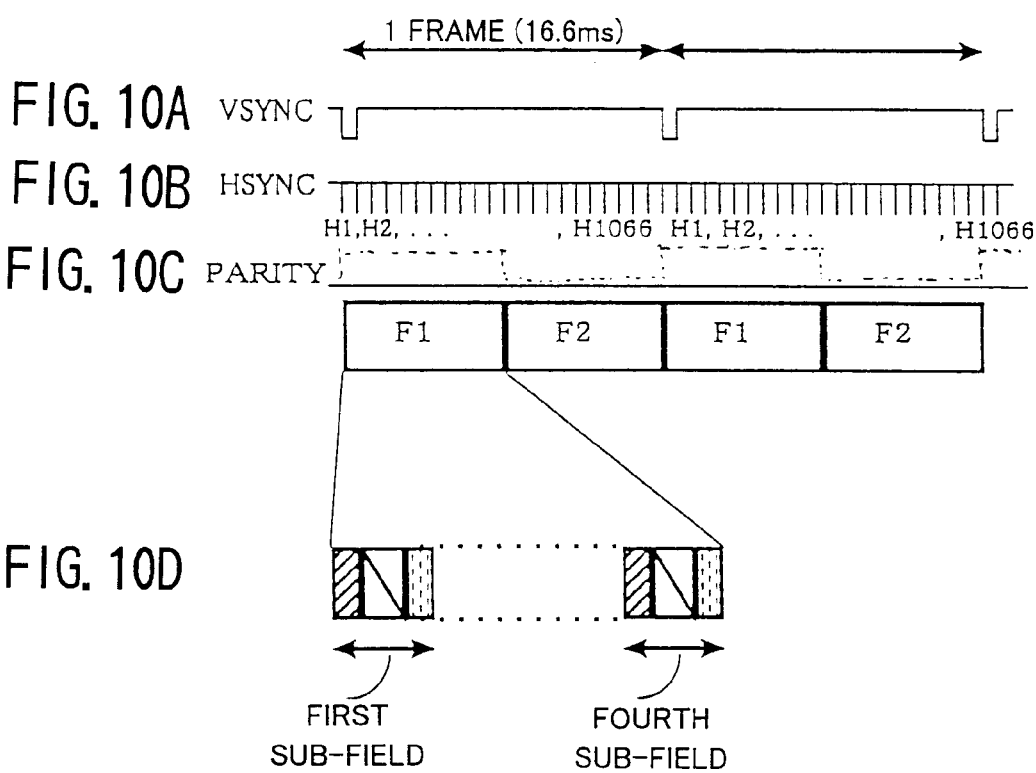

US 6,559,814 B1

DRIVING PLASMA DISPLAY PANEL WITHOUT VISIBLE FLICKERING

BACKGROUND OF THE INVENTION

1. Field of the Invention

The present invention generally relates to a method and a device for driving a display, and particularly relates to a method and a device which are suitable for driving a plasma display panel (hereinafter referred to simply as PDP).

2. Description of the Related Art

There is a PDP which performs surface discharge. In such a PDP, all the pixels of the display screen simultaneously glow in accordance with data to be displayed. A PDP that performs surface discharge includes a pair of electrodes inside a front glass panel, and contains rare gas inside the sealed space. As a voltage is applied between the electrodes, surface discharge is observed between the surfaces of the electrodes having a dielectric layer and a protection layer formed thereon. This discharge generates ultraviolet light. An inner surface of a rear glass panel is provided with fluorescent materials corresponding to three primary colors, i.e., red (R), green (G), and blue (B). The ultraviolet light excites the fluorescent materials such that these materials emit light to achieve color display. Here, fluorescent materials for R, G, and B are provided for each pixel of the display screen.

Since the PDP is a light emitting device, it provides a visually better display quality. Also, the PDP can provide a large display screen with a thin bulk. All of these factors make the PDP an attractive display device of the next generation to replace the CRT device. A PDP of a surface AC (alternating current) discharge type is especially suitable for a large display screen, and is expected to be a main display device to be used along with high-definition digital television technology. In an information age which is further advancing as can be seen in development of the Internet, a display device is expected to be an integrated part of the multi-media technology, which combines video media such as television with information media such as personal computers.

In such application, HDTV broadcasting utilizing more than 1,000 scan lines or DVD media may serve as a video source. As far as displaying of information is concerned, an effort to attain finer display details has got to a point where we have an SXGA of 1280-x-1024 dots, and a display format is ever more diversified. Against this background, a display device which can cope with various formats and has more than 1000 scan lines is necessary.

FIGS. 1 and 2 are a plan view and a cross-sectional view, respectively, of a PDP disclosed in Japanese Laid-Open Patent Application No. 9-160525 by the applicant of the present application. This PDP is driven based on an ALIS (alternate lighting of surface) method. In FIGS. 1 and 2, a PDP 1 includes a front glass panel 3, discharge sustaining electrodes X1, Y1, X2, Y2, X3, and Y3 provided in parallel on the front glass panel 3, a rear glass panel 4, address electrodes A1 through A4 provided on the rear glass panel 4 in perpendicular to the discharge sustaining electrodes, barrier ribs 2 which shield discharge spaces from each other by extending in parallel to the address electrodes, fluorescent material 5 applied on the rear glass panel 4, and a gas contained between the front glass panel 3 and the rear glass panel 4 for facilitating discharge.

As shown in FIG. 2, a single discharge cell is defined by two discharge sustaining electrodes (e.g, X1 and Y1) and an address electrode (e.g., A1). A discharge sustaining electrode can maintain discharge with adjacent discharge sustaining electrodes on either side thereof, so that all the gaps between the discharge sustaining electrodes shown in FIG. 1, i.e., lines L1 through L5, serve as display lines. For example, the discharge sustaining electrodes X1 and Y1 together create the display line L1, and the discharge sustaining electrodes Y1 and X2 together create the display line L2.

In FIG. 2, a voltage is applied between the discharge sustaining electrodes X1 and Y1 to generate discharge in a discharge area D1, and a voltage is applied between the discharge sustaining electrodes Y1 and X2 to generate discharge in a discharge area D2. By the same token, a voltage is applied between the discharge sustaining electrodes X2 and Y2 to generate discharge in a discharge area D3. In this manner, a single discharge sustaining electrode is used for generating display lines on either side thereof. This configuration makes it possible to reduce the number of discharge sustaining electrodes, thereby achieving a finer display pitch and reducing the number of driver circuits for driving the discharge sustaining electrodes.

FIG. 3 is an illustrative drawing showing a configuration of a frame which the PDP displays.

One frame is comprised of a first field and a second field. A field frequency is 60 Hz, so that the field cycle is 16.6 msec. The first field displays odd-number display lines L1, L3, L5, and so on, and the second field displays even-number display lines L2, L4, L6, and so on, thereby displaying all the display lines. Namely, the display scheme is similar to interlace scanning of a CRT device. Each field is comprised of first through eighth sub-field, each of which has a different luminance ratio, i.e., a different discharge period (the number of discharges). The sub-fields are selectively lighted up in accordance with display data so as to represent a different luminance level of each pixel. Each sub-filed includes a reset period for making uniform the conditions of discharge cells as the conditions of discharge cells depend on the way the immediately preceding sub-field was displayed. Each sub-field further includes an address period for writing new display data and a discharge sustaining period for displaying the display data via discharge sustaining operations.

FIGS. 4A through 4E are illustrative drawings showing signal forms of a given sub-field of the first field in a PDP device. As shown in FIGS. 4B and 4D, a reset pulse having a peak voltage Vw, which is greater than a voltage to generate discharge, is applied to all the X-series discharge electrodes during the reset period. This generates first discharge at all the lines L1 through L5. As a result, each discharge cell has a wall voltage developed based on positive ions or electrons.

After the reset pulse, the wall voltage generates a second discharge. Since there is no voltage differential between the discharge electrodes at this time, positive ions and electrons generated by the discharge end up being connected to each other in the discharge space, resulting in disappearance of the wall voltage. This discharge works to make the conditions of all the discharge cells uniform.

During the address period, as shown in FIGS. 4C and 4E, the discharge sustaining electrodes Y1 and Y2 in this order receive a scan pulse, which changes from a voltage −Vc to a voltage −Vy. At the same time, scan pulses having a peak voltage Va are supplied to the address electrodes in accordance with the display data, thereby effecting discharge. When this happens, the discharge sustaining electrode X1 forming a pair with the discharge sustaining electrode Y1 for display in the first field receives a pulse having a voltage Vx, so that the discharge generated between the address electrodes and the discharge sustaining electrode Y1 is shifted to a space between the discharge sustaining electrodes X1 and Y1.

This generates wall charge necessary for maintaining the discharge in the space between the discharge sustaining electrodes X1 and Y1. Since the discharge sustaining electrode X2 forming a line which does not display at the same timing with the discharge sustaining electrode X1 receives 0 V as shown in FIG. 4D, spreading of the discharge area toward the discharge sustaining electrode X2 is prevented.

When the scan pulse having the voltage −Vy is applied to the discharge sustaining electrode Y2, the discharge sustaining electrode X2 forming a display pair with the discharge sustaining electrode Y2 receives a pulse having the voltage Vx. At this time, the discharge sustaining electrode X3 receives 0 V. In this manner, scan pulses are successively applied to the Y-series discharge sustaining electrodes, thereby effecting address discharge with respect to all the odd-number display lines of the display screen.

In the discharge sustaining period, sustaining pulses are applied to the X-series discharge electrodes and the Y-series discharge electrodes in turn. The sustaining pulses are adjusted to have such a phase that a voltage difference between discharge electrodes forming a pair for a non-display line is always zero. In this manner, discharge at the non-display line is avoided. For example, the discharge electrodes X1 and Y1 forming a pair for displaying a line in the first field receive respective sustaining pulses having different phases, while the discharge electrodes X2 and Y1 forming a pair for a non-displayed line in the first field receive respective sustaining pulses having the same phase. In this manner, one sub-field is displayed.

In the same fashion, all the even-number lines are displayed in the second field. FIGS. 5A through 5E are illustrative drawings showing signal forms of a given sub-field of the second field. FIGS. 5A through 5E differ from FIGS. 4A through 4E in that the signal form of the discharge electrode X1 shown in FIG. 5B and the signal form of the discharge electrode X2 shown in FIG. 5D are exchanged. In this manner, a voltage is applied between the discharge electrodes which form a pair across even-number lines during the address period and the discharge sustaining period.

Displaying of the first field and displaying of the second field are performed one after the other so as to present a new image in every one frame (33 msec). This configuration can easily implement more than 1000 display lines on a display device.

In related-art devices, interlace scanning similar to that of the conventional television signal is employed. This may lead to generation of flicker, depending on what is displayed on the screen.

FIG. 6 is an illustrative drawing for explaining generation of flicker.

A situation in which the display line L3 alone is lighted up in FIG. 6 is taken as an example. The display line L3 is an odd-number line, and, thus, is lighted up in the first field. During the second field, the display line L3 is not lit up since only the even-number lines are lighted up in the second field. Accordingly, it is the first field of the next frame when the display line L3 glows again. In this case, a display interval is 33 msec. In general, human vision cannot recognize a change in light intensity when the light intensity changes at intervals shorter than 20 msec, i.e., when the light intensity changes with a frequency exceeding 50 Hz. When the light intensity changes at intervals longer than 20 msec however, such a change is recognized as flashing on/off. Because of such nature of human vision, the displaying of the line L3 described above is registered as conspicuous flicker.

In video images such as those of television broadcasting, no display pattern includes a single isolated flashing line, so that flicker, if any, may be present only within a tolerable level. When computer-related data is displayed by personal computers, however, small letters and drawings may be displayed, which may result in apparent flickering.

Accordingly, there is a need for a method and a device for driving a display which can prevent generation of flickering regardless of what is displayed on the screen.

SUMMARY OF THE INVENTION

Accordingly, it is a general object of the present invention to provide a method and a device for driving a display which can satisfy the need described above.

It is another and more specific object of the present invention to provide a method and a device for driving a display which can prevent generation of flickering regardless of what is displayed on the screen.

In order to achieve the above objects according to the present invention, a method of displaying display data on a plasma display panel which displays odd-number lines in a plurality of sub-fields and even-number lines in a plurality of sub-fields includes the steps of checking whether the display data is computer-related data or video data, displaying odd-number lines in a predetermined number of sub-fields during a given vertical scan cycle and even-number lines in the predetermined number of sub-fields during another vertical scan cycle if the display data is video data, and displaying odd-number lines in half the predetermined number of sub-fields and even-number lines in the remaining half of the predetermined number of sub-fields in each vertical scan cycle if the display data is computer-related data.

According to the method described above, the video data is displayed in such a conventional interlacing fashion that the odd-number lines are displayed in a predetermined number of sub-fields during a given vertical scan cycle, and even-number lines are displayed in the predetermined number of sub-fields during another vertical scan cycle. On the other hand, the computer-related data is displayed by displaying odd-number lines in half the predetermined number of sub-fields and even-number lines in the remaining half of the predetermined number of sub-fields in each vertical scan cycle, so that displaying of the odd-number lines and the displaying of the even-number lines are performed in turn within a single vertical scan period. This configuration insures that while a given line of the video data is lighted up in every other vertical scan cycle, a given line of the computer-related data is lighted up in every vertical scan cycle. Because of a shorter field interval for the computer-related data, no flicker is observed regardless of the contents of the computer-related data.

Other objects and further features of the present invention will be apparent from the following detailed description when read in conjunction with the accompanying drawings.

BRIEF DESCRIPTION OF THE DRAWINGS

FIGS. 9A through 9D are sequence charts showing time sequences of display operations during a video mode;

FIGS. 10A through 10D are sequence charts showing time sequences of display operations during a computer-related-data mode;

DESCRIPTION OF THE PREFERRED EMBODIMENTS

Figure 7:
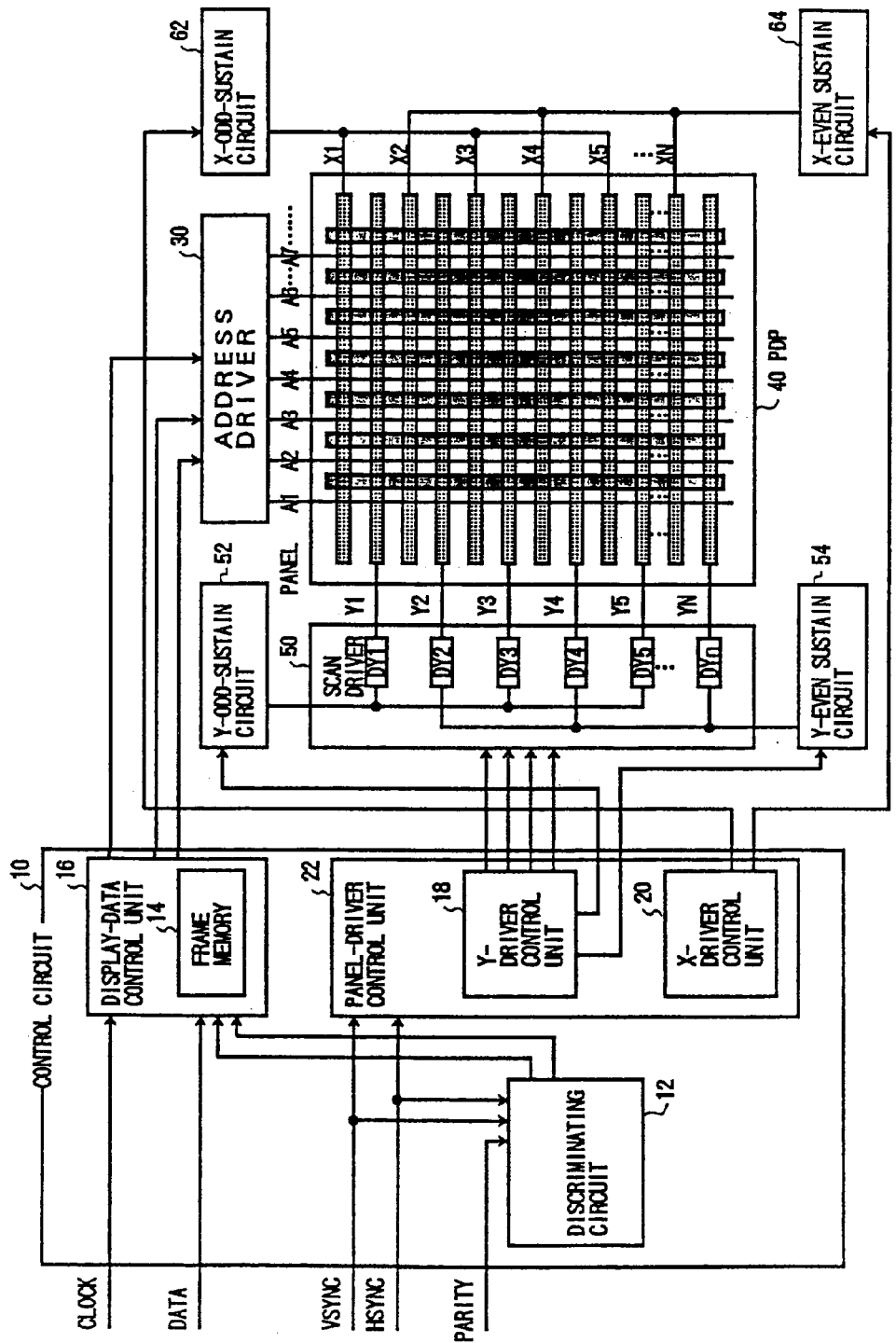
FIG. 7 is a block diagram showing an embodiment of a PDP device according to the present invention.

FIG. 7 is a block diagram showing an embodiment of a PDP device according to the present invention.

In FIG. 7, a control circuit 10 includes a discriminating circuit 12, a display-data control unit 16 including a frame memory 14 for storing two-frame's worth of display data, and a panel-driver control unit 22 including a Y-driver control unit 18 and a X-driver control unit 20. The discriminating circuit 12 determines whether the display data is video data or computer-related data, and such a determination is made based on a vertical synchronization signal VSYNC, a horizontal synchronization signal HSYNC, and a PARITY signal indicating either the odd field or the even field. A signal indicative of the result of the determination is supplied to the Y-driver control unit 18 and the X-driver control unit 20.

Figure 1:
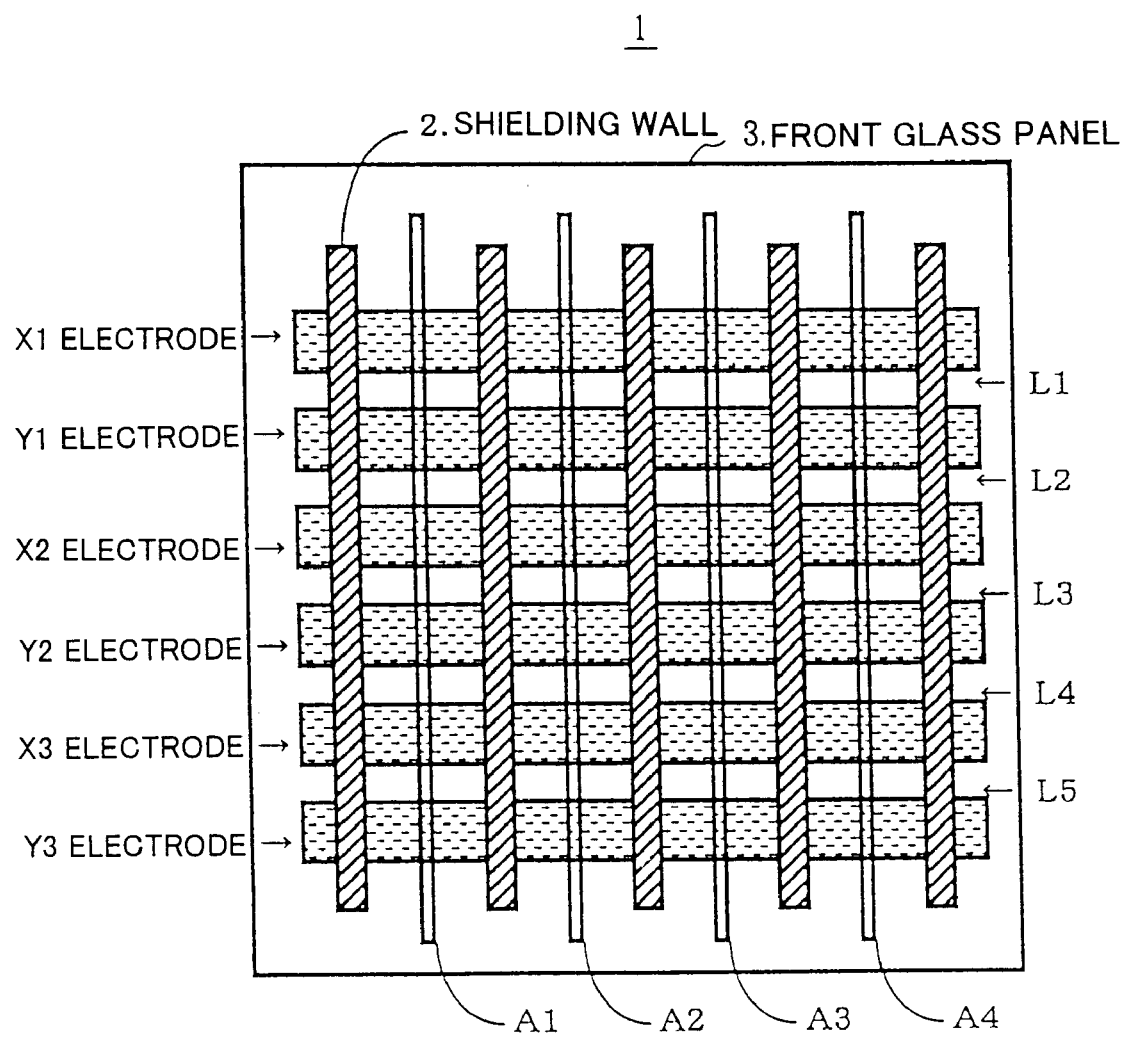
FIG. 1 is a plan view of a related-art PDP.
Figure 2:
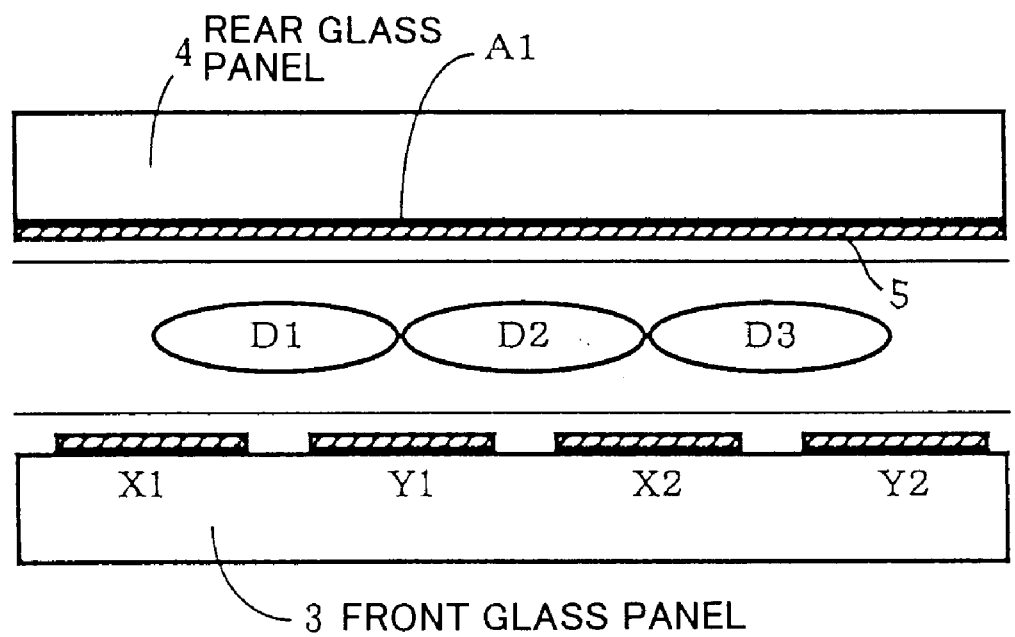
FIG. 2 is a cross-sectional view of the related-art PDP.
Figure 3:
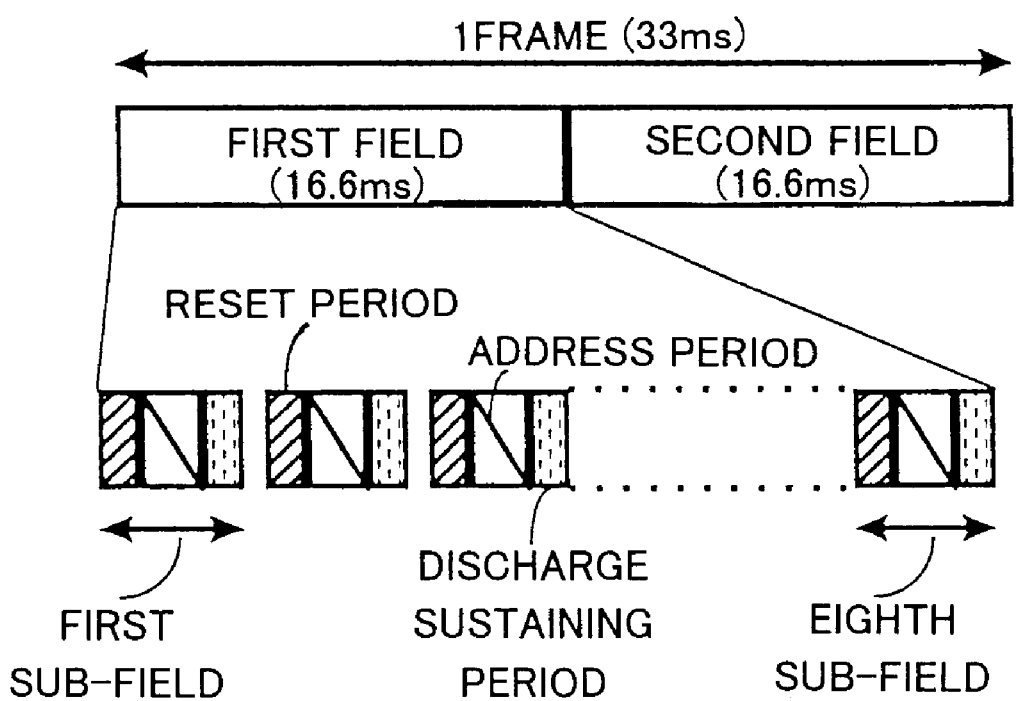
FIG. 3 is an illustrative drawing showing a configuration of a frame which the related-art PDP displays.
Figure 4:
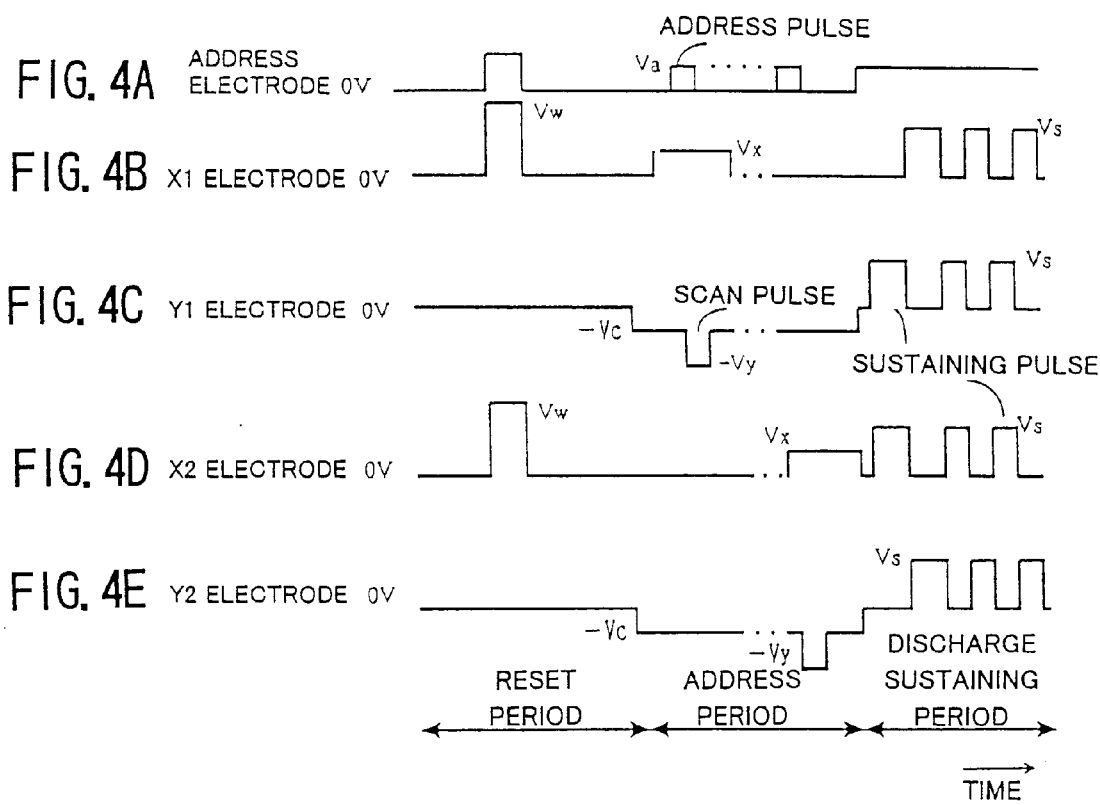
FIGS. 4A through 4E are illustrative drawings showing signal forms of a given sub-field of the first field in a PDP device.
Figure 5:
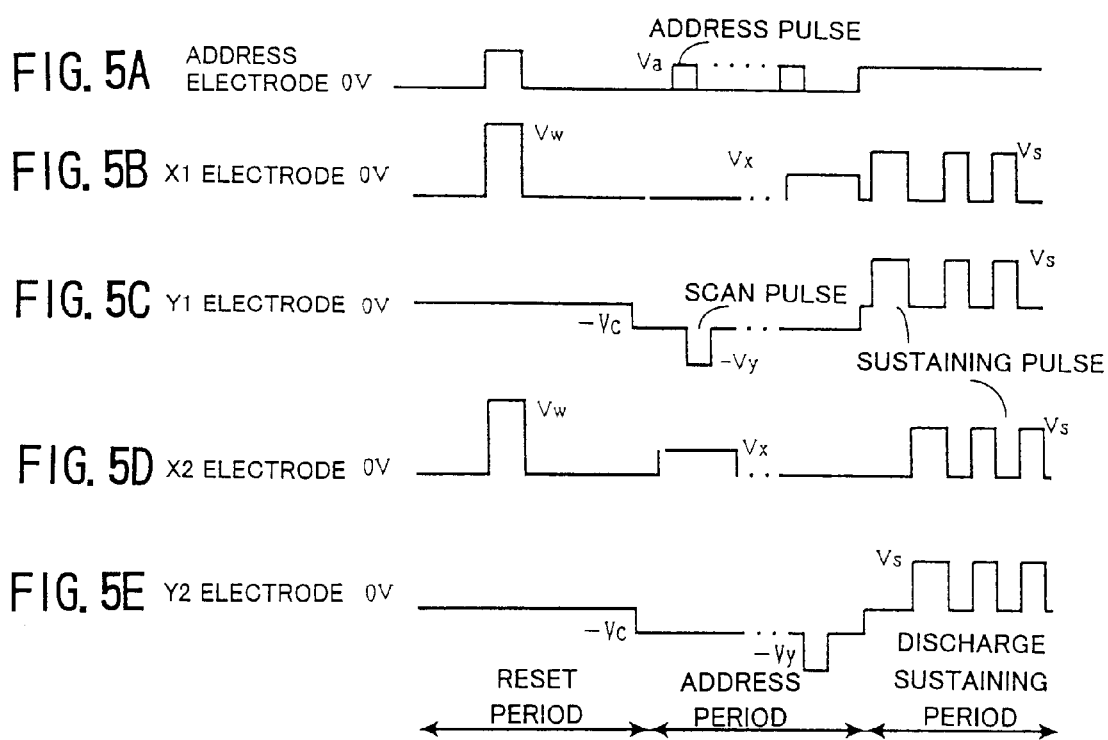
FIGS. 5A through 5E are illustrative drawings showing signal forms of a given sub-field of the second field.
Figure 6:
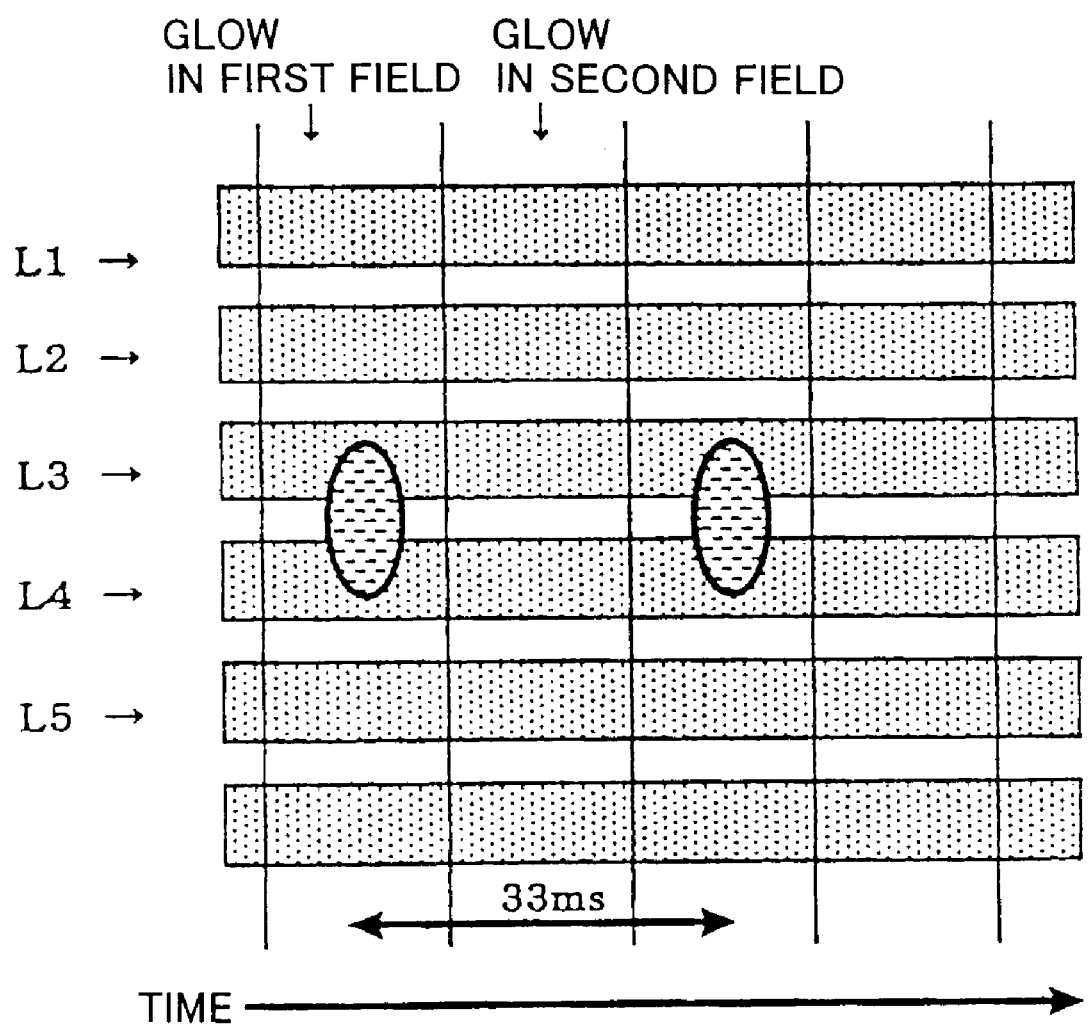
FIG. 6 is an illustrative drawing for explaining generation of flicker.

The display-data control unit 16 receives the display data, and writes the display data in the frame memory 14. Further, the display-data control unit 16 reads display data A-DATA from the frame memory 14, and supplies the display data A-DATA, a transfer clock A-CLOCK, and a latch clock A-LATCH to the address driver 30. The address driver 30 successively selects address electrodes A1–A7 and so on in a PDP 40, and drives the selected address electrodes based on the voltage level Va in the same manner as shown in FIGS. 4A and 5A. The PDP 40 has the same configuration as shown in FIG. 1 and FIG. 2.

The Y-driver control unit 18 of the panel-driver control unit 22 generates scan data Y-DATA, a Y clock Y-CLOCK, a first Y strobe Y-STB1, and a second Y strobe Y-STB2, and supplies them to a scan driver 50. Further, the panel-driver control unit 22 generates a Y-up drive signal Y-UD1 and a Y-down drive signal Y-DD1, and supplies them to a Y-odd-sustain circuit 52. Moreover, the panel-driver control unit 22 generates a Y-up drive signal Y-UD2 and a Y-down drive signal Y-DD2, and supplies them to a Y-even-sustain circuit 54.

The X-driver control unit 20 generates a X-up drive signal X-UD1 and a X-down drive signal X-DD1, and supplies them to a X-odd-sustain circuit 62. Further, the X-driver control unit 20 generates a X-up drive signal X-UD2 and a X-down drive signal X-DD2, and supplies them to a X-even-sustain circuit 64.

The scan driver 50 includes a N-stage shift-register and N drivers wherein the N drivers are connected to the discharge sustaining electrodes Y1 through YN corresponding to the N stages of the shift-register. During an address period, an input terminal of the shift-register receives a value "1" only at a first address cycle of each sub-field, and this input is successively shifted in synchronism with address cycles. Outputs of the shift-register control the drivers to turn on/off, so that either the voltage −Vy or the voltage −Vc is applied to the discharge sustaining electrodes Y1 through YN. In other words, the shift operations of the shift-register successively select one of the discharge sustaining electrodes Y1 through YN, and the voltage −Vy is applied to the selected electrode while the voltage −Vc is supplied to unselected electrodes. The voltages −Vy and −Vc are supplied from the Y-odd-sustain circuit 52 and the Y-even-sustain circuit 54.

During a sustaining period, the Y-odd-sustain circuit 52 supplies a first series of sustaining pulses to the odd-number discharge sustaining electrodes Y1, Y3, and so on, and the Y-even-sustain circuit 54 supplies a second series of sustaining pulses having a 180°-phase difference with the first series of sustaining pulses to the even-number discharge sustaining electrodes Y2, Y4, and so on. In this manner, the Y-series discharge sustaining electrodes Y1 through YN are driven by the voltages −Vy, −Vc, and Vs as shown in FIGS. 4C and 4E and FIGS. 5C and 5E.

As for the discharge sustaining electrodes X1 through XN, during the sustaining period, the odd-number discharge sustaining electrodes X1, X3, and so on receive a second series of sustaining pulses from the X-odd-sustain circuit 62, while the even-number discharge sustaining electrodes X2, X4, and so on receive a first series of sustaining pulses having a 180°-phase difference with the second series of sustaining pulses from the X-even-sustain circuit 64. During a reset period, the X-odd-sustain circuit 62 and the X-even-sustain circuit 64 supply the reset pulses having the voltage Vw. During the address period, the odd-number discharge sustaining electrodes X1, X3, and so on receive a series of 2-address-cycle pulses from the X-odd-sustain circuit 62 in association with the scan pulses, and the even-number discharge sustaining electrodes X2, X4, and so on receive a series of 2-address-cycle pulses having a 180°-phase difference with the above-mentioned series of pulses from the X-even-sustain circuit 64. In this manner, the X-series discharge sustaining electrodes X1 through XN of the PDP 40 are driven by the voltages Vw, Vx, and Vs as shown in FIGS. 4B and 4D and FIGS. 5B and 5D.

Figure 8:
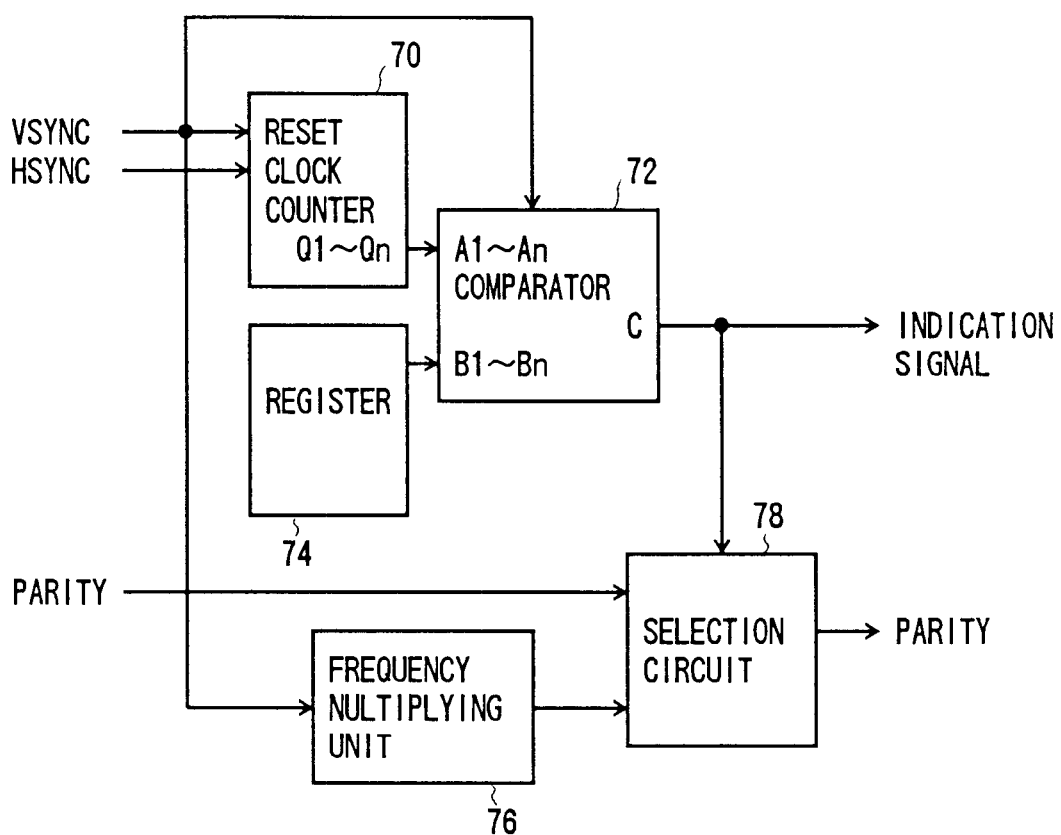
FIG. 8 is a block diagram showing an embodiment of a discriminating circuit shown in FIG. 7.

FIG. 8 is a block diagram showing an embodiment of the discriminating circuit 12.

In the figure, a counter 70 is reset by a falling edge of the vertical synchronization signal VSYNC, and counts up at rising edges of the horizontal synchronization signal HSYNC. When such video data based on interlace scanning as may be used in HDTV broadcasting is supplied in a video mode, the number of horizontal synchronization signals HSYNC in a single vertical scan period is 520 as shown in FIGS. 9A and 9B. When SXGA video data is supplied in a computer-related-data mode, on the other hand, the number of the horizontal synchronization signals HSYNC in one vertical scan period is 1066 as shown in FIGS. 10A and 10B.

A register 74 of FIG. 8 may store a midpoint value between 520 and 1066 such as 800. A comparator 72 compares the count of the counter 70 with the value of 800 stored in the register 74 at a timing of a falling edge of the vertical synchronization signal VSYNC. If the count is below the value of 800, it is ascertained that the mode is the video mode. If the count exceeds 800, on the other hand, it is ascertained that the mode is the computer-related-data mode. The comparator 72 outputs an indication signal that is at a low level in the video mode and at a high level in the computer-related-data mode.

As shown in FIG. 9C, the PARITY signal maintains a high level during an odd field and a low level during an even field if the mode is the video mode. In the computer-related-data mode, however, the PARITY signal is at the low level all the time as shown by solid lines in FIG. 10C. A frequency multiplying unit 76 doubles a frequency of the vertical synchronization signal VSYNC. A selection circuit 78 selects the PARITY signal when the indication signal indicates the video mode, and selects an output of the frequency multiplying unit 76 when the indication signal indicates the computer-related-data mode. The selected signal is output as a PARITY signal. Namely, the computer-related-data mode results in the PARITY signal as shown by dotted lines in FIG. 10C. The PARITY signal and the indication signal are supplied to the display-data control unit 16.

In the video mode, the PARITY signal indicating whether a current stream of the video data is of the odd field or the even field is supplied to the display-data control unit 16 along with the display data (video data) itself. The display data is stored in the frame memory 14 in accordance with what the PARITY signal indicates. The stored display data is successively read during the next frame cycle, and address pulses for selecting the address electrodes A1 through AM are generated.

During the operation of the PDP 40, odd-number lines are displayed in the first through eighth sub-fields of the first field (16.6 msec) in accordance with the PARITY signal, and even-number lines are displayed in the first through eighth sub-fields of the second field (16.6 msec). In this manner, one frame cycle is 33 msec in the video mode.

In the computer-related-data mode, the display data (computer-related data) and the PARITY signal are supplied to the display-data control unit 16. The PARITY signal in this case, however, does not indicate whether a current stream of the computer-related data is for even-number lines or for the odd-number lines. Because of this, the display data is stored in the frame memory 14 in an order in which the display data is supplied. The stored display data is successively read during the next frame cycle (one frame cycle in the computer-related-data mode corresponds to one field cycle of the video mode), and address pulses for selecting the address electrodes A1 through AM are generated.

During the operation of the PDP 40, odd-number lines are displayed in the first through fourth sub-fields of the first field in accordance with the PARITY signal, and even-number lines are displayed in the first through fourth sub-fields of the second field.

Figure 11:
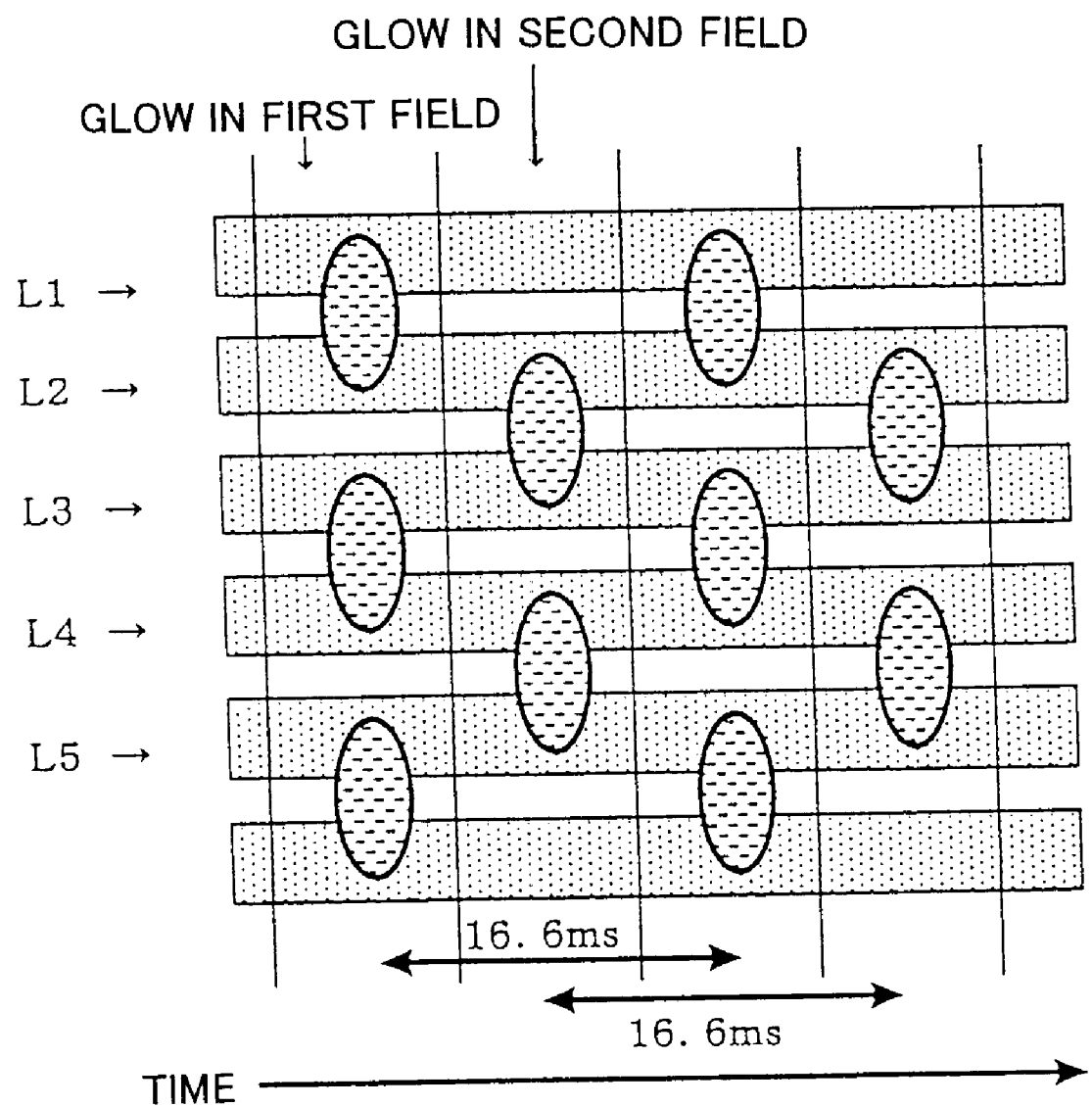
FIG. 11 is an illustrative drawing for explaining glowing operations of the PDP according to the present invention.

FIG. 11 is an illustrative drawing showing the way the data is displayed in the computer-related-data mode.

In FIG. 11, if the display line L3 alone is to be lighted up, the display line L3 which is an odd-number line glows in the first field, and does not glow in the second field because only even-number lines are lighted up in the second field. The display line L3 will be lighted up again when the first field of the next frame is displayed. An interval at which the display line L3 intermittently glows in 16.6 msec, which is shorter than 33 msec. Human vision cannot perceive a change in light intensity if the light intensity changes at intervals short than 20 msec, i.e., if the light intensity changes at a frequency exceeding 50 Hz. Because of this, no flicker is perceived in the case described above, resulting in high quality display. In this manner, a frame cycle during which the even-number lines and the odd-number lines are displayed in turn is set to shorter than 33 msec, and, preferably, to shorter than 20 msec. Accordingly, odd-number lines and the even-number lines are displayed within such a time period as generation of flicker is prevented even when odd-number lines alone or even-number lines alone are displayed.

The first through fourth sub-fields have a luminance ratio thereof set to 1, 2, 4, and 8, respectively, so that only 16 different levels or 4096 different colors can be represented. In the computer-related-data mode, only a limited number of colors are generally used. In this regard, the fact that fewer colors are available in the computer-related-data mode than in the video mode should not create a problem in practice.

Figure 12:
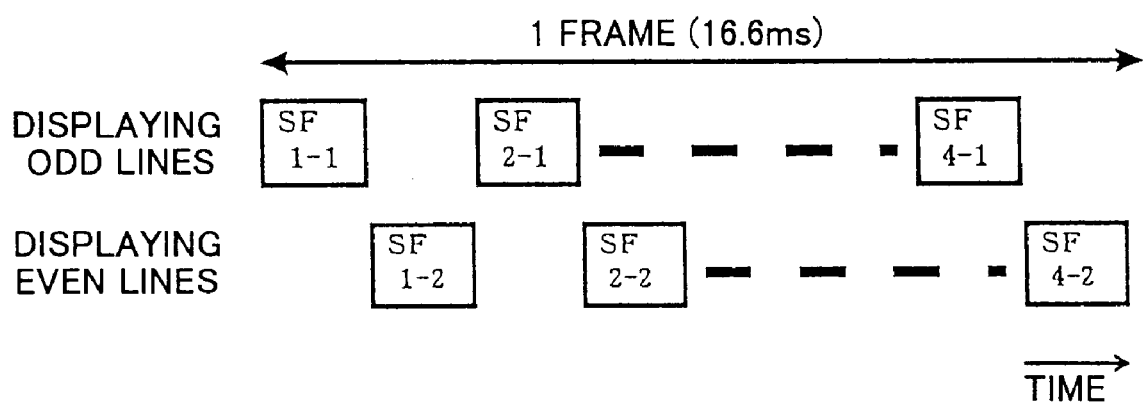
FIG. 12 is an illustrative drawing showing a variation of a frame structure according to the present invention.

The above embodiment has been described with reference to a case in which the odd-number lines are displayed in the first through fourth sub-fields of the first field, and the even-number lines are displayed in the first through fourth sub-fields of the second field. Alternatively, as shown in FIG. 12, the first sub-field for the odd-number lines, the first sub-field for the even-number lines, the second sub-field for the odd-number lines, the second sub-field for the even-number lines, the third sub-field for the odd-number lines, the third sub-field for the even-number lines, the fourth sub-field for the odd-number lines, and the fourth sub-field for the even-number lines may be displayed in this order during one frame cycle of 16.6 msec.

The counter 70, the comparator 72, and the register 74 together form a check unit, and the frequency multiplying unit 76 and the selection circuit 78 together constitute a frame-cycle changing unit.

Further, the present invention is not limited to these embodiments, but various variations and modifications may be made without departing from the scope of the present invention.

The present application is based on Japanese priority application No. 10-280343 filed on Oct. 1, 1999, with Japanese Patent Office, the entire contents of which are hereby incorporated by reference.

What is claimed is:

1. A method of displaying display data on a plasma display panel which displays odd-number lines in a plurality of sub-fields and even-number lines in a plurality of sub-fields, said method comprising the steps of:

checking whether the display data is computer-related data or video data;

displaying odd-number lines in a predetermined number of sub-fields during a given vertical scan cycle and even-number lines in the predetermined number of sub-fields during another vertical scan cycle if the display data is video data; and displaying odd-number lines in a lesser number of sub-fields than the pre-determined number of sub-fields and even-number lines in a lesser number of sub-fields than the predetermined number of sub-fields in each vertical scan cycle if the display data is computer-related data.

2. The method as claimed in claim 1, wherein the vertical scan cycle is 16.6 msec.

3. The method as claimed in claim 1, wherein said odd-number lines in the lesser number of sub-fields are consecutively displayed first, and said even-number lines in the lesser number of sub-fields are consecutively displayed thereafter in each vertical scan cycle.

4. The method as claimed in claim 1, wherein each of the lesser number of sub-fields for displaying the odd-number lines and each of the lesser number of sub-fields for displaying the even-number lines are displayed in turn.

5. A device for driving a plasma display panel having first discharge sustaining electrode and second discharge sustaining electrodes arranged in turn on a panel to extend in parallel, wherein each of odd-number display lines is formed as a gap between a first discharge sustaining electrode and a second discharge sustaining electrode arranged on one side of the first discharge sustaining electrode, and each of even-number display lines is formed as a gap between a first discharge sustaining electrode and a second discharge sustaining electrode arranged on another side of the first discharge sustaining electrode, said device comprising:

a check unit which checks whether display data is video data or computer-related data based on a number of horizontal synchronization pulses included within a vertical scan period; and a frame-cycle changing unit, responsive to a check result of said check unit, changing between first and second frame cycles of corresponding, shorter and longer durations for display respectively of video data and computer-related data.

6. The device as claimed in claim 5, wherein said check unit includes:

a register which stores a reference value; and a comparator which compares the number of horizontal synchronization pulses with the reference value.

7. A device for displaying display data using a plasma display panel, said device comprising:

a check unit configured to check whether the display data is computer-related data or video data; and a display-data control unit configured to display odd-number lines in a predetermined number of sub-fields during a given vertical scan cycle and even-number lines in the predetermined number of sub-fields during another vertical scan cycle if the display data is video data, and to display odd-number lines in a lesser number of sub-fields than the predetermined number of sub-fields and even-number lines in a lesser number of sub-fields than the predetermined number of sub-fields in each vertical scan cycle if the display data is computer-related data.

8. A device for displaying display data using a plasma display panel, said device comprising:

check means for checking whether the display data is computer-related data or video data; and display-data control means for displaying odd-number lines in a predetermined number of sub-fields during a given vertical scan cycle and even-number lines in the predetermined number of sub-fields during another vertical scan cycle if the display data is video data, and for displaying odd-number lines in a lesser number of sub-fields than the predetermined number of sub-fields and even number lines in a lesser number of sub-fields than the predetermined number of sub-fields in each vertical scan cycle if the display data is computer-related data.

* * * * *